UNITED STATES PATENT OFFICE.

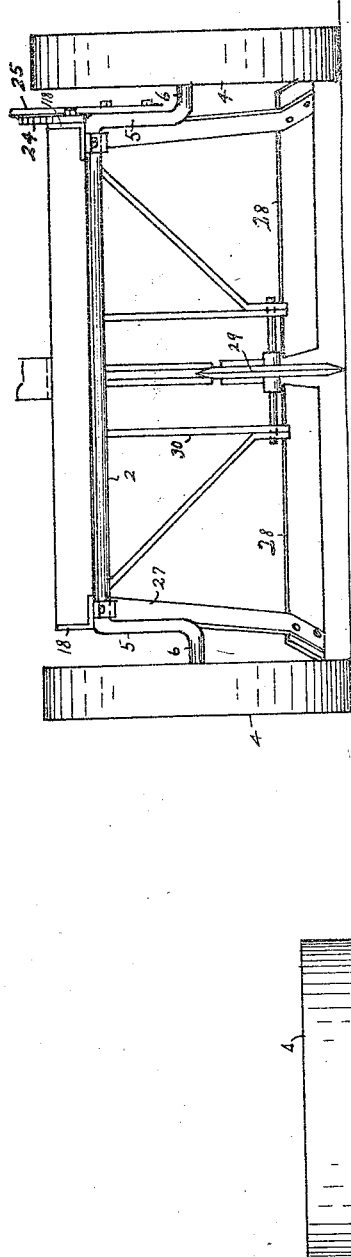

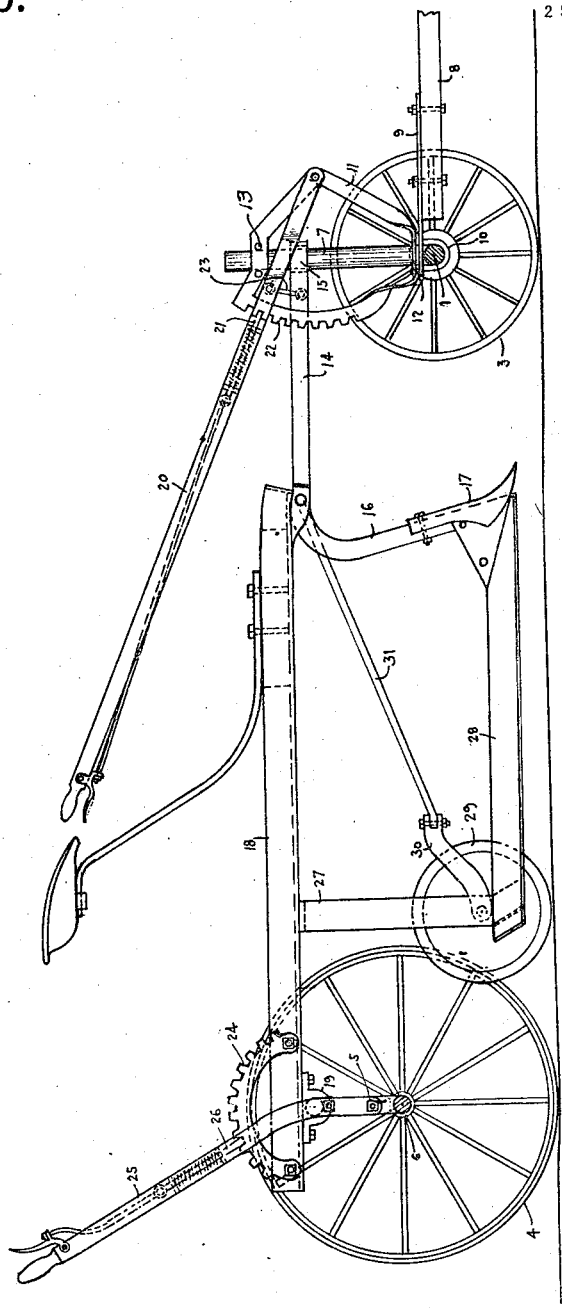

SAMUEL E. MILLS, OF RAYMONDVILLE, TEXAS.

CULTIVATOR.

1,286,710.

Specification of Letters Patent.

Patented Dec. 3, 1918.

Application filed December 11, 1917. Serial No. 206,580.

*To all whom it may concern:*

Be it known that I, SAMUEL E. MILLS, a citizen of the United States, residing at Raymondville, in the county of Cameron and State of Texas, have invented certain new and useful Improvements in Cultivators, of which the following is a specification.

This invention relates to new and useful improvements in a cultivator.

The object of the invention is to provide an implement of the character described particularly designed for the purpose of cutting weeds and stalks and for stirring and pulverizing the surface of the ground to cause it to better retain moisture.

With the above and other objects in view the invention has particular relation to certain novel features of construction, operation, and arrangement of parts, an example of which is given in this specification and illustrated in the accompanying drawings, wherein:

Figure 1 is a plan view of the device.

Fig. 2 is a sectional side elevation.

Fig. 3 is a rear view showing the rear axle, with the front part of the device broken away.

Referring now more particularly to the drawings wherein like numerals of reference designate similar parts in each of the figures, numerals 1 and 2 refer, respectively, to the front and rear axles supported, respectively, by the front and rear wheels 3, 3, and 4, 4. The rear axle is turned down at each end forming the elbows 5, 5 whose free ends are turned outwardly forming the spindle 6 whereon the supporting wheels 4, 4, rotate, and the front axle has a central upstanding standard 7 formed integral therewith. A tongue 8 is provided which is secured to the tongue plate 9, said plate being provided with a bearing to receive the standard 7 and being secured to the front axle by means of U-bolts 10. A rack member 11, substantially triangular in form, is provided which rests upon the tongue plate 9 and the lower part of which has a bearing 12 provided to receive said standard and the upper part of this rack member is secured to the standard by means of the U-bolts 13. A beam 14 is provided whose forward end is formed into a bearing 15 which slides upon the standard 7 and whose rear end is turned downwardly forming the stock 16 provided to support the share 17. A frame is provided formed of the side members 18, 18, whose forward ends converge and are secured to the beam 14. The rear ends of these said members rest upon the rear axle 2 and are provided with bearings 19, 19 in which said rear axle rotates. A manual lever 20 is pivoted at its front end to the front side of the rack member 11 and this lever carries a manually operated dog 21, normally in mesh with the rack 22 into which the rear side of the member 11 is formed. A link 23 is pivoted at its respective ends to the manual lever 20 and to the beam 14 and said beam, and the front end of the frame, may be elevated and lowered by releasing the dog 21 and manipulating the lever 20 up or down.

Secured to the rear end of one of the side members 18 is a rack 24, and secured to the corresponding elbow 5 of the rear axle 2 is a manual lever 25 provided with a dog 26, normally engaging with said rack member. The rear end of the frame 18 may be lowered by manually releasing the dog 26 and pulling the manual lever 25 forwardly and when the frame is lowered to the desired position the dog 26 may be released to engage with the rack member 24 to hold the frame at the desired point of elevation, and the rear end of the frame may be elevated by the reverse movement of said lever 25.

A transverse brace 27 is secured underneath the side members 18 and its ends are turned downwardly. Cutter blades 28, 28 are provided on each side whose rear ends are secured to the down turned ends of the brace 27, and whose forward ends are secured to the lower end of the stock 16. These blades converge forwardly and have an outward inclination and their outer edges are formed into sharp cutting edges and a circular colter 29 is rotatably mounted in the frame 30, which depends from the brace 27; and anchored to the frame of the colter 29, at one end, and to the beam 14 at its other end, an anchor bar 31 is provided to strengthen the colter frame 30. In operation the front and rear ends of the frame are lowered, as described, through the manual levers 20 and 25, so that the share 17 and the cutter blades will penetrate the surface of the ground. The blades will cut off weeds, stalks, and the like under the surface of the ground and at the same time will loosen up and pulverize the surface. The implement is particularly adapted for cutting stalks in rows, and when used for this purpose, the colter 29 operates to hold the blades firmly against the row of stalks forcing the machine to travel in a straight line and prevents the side movement thereof, said colter being of a diameter to penetrate the ground somewhat deeper than the blades 28.

The implement frame may be lowered through said manual levers 20 and 25, as hereinbefore explained, causing the shaft 17 and the colter blades to clear the surface of the ground, and may be locked in said elevated position through the instrumentality of the dogs 21 and 26 by the rack and dog arrangements, as shown and in the well known manner.

What I claim is:

A device of the character described including front and rear axles, carrier wheels supporting said axles, a beam carried by the front end of the frame, and vertically adjustable relative to the front axle, the rear end of the beam being curved downwardly and forming a stock, means for securing said beam and stock against vertical movement relative to the front axle, a share carried by the lower end of the stock, a colter support depending from the frame, a rotatable disk-like colter carried by said support and having a sharp cutting edge which penetrates the ground surface, a cutting blade arranged on each side, the rear end of each blade being secured to the colter support and the forward ends thereof converging and being secured to said stock, said blades having outward inclination, and the outer edges being formed into sharp cutting edges, and said colter forming an anchor to hold the blades against lateral movement.

In testimony whereof I have signed my name to this specification in the presence of two subscribing witnesses.

SAMUEL E. MILLS.

Witnesses:
C. H. PEASE,
C. B. TOMM.